(12) United States Patent
Butler et al.

(10) Patent No.: US 8,317,115 B2
(45) Date of Patent: Nov. 27, 2012

(54) MICRO-EROSION RECOVERY SYSTEM FOR TIRE MATERIALS

(76) Inventors: Andy Butler, Chester (CA); Devron Kobluk, Brandon (CA)

( * ) Notice: Subject to any disclaimer, the term of this patent is extended or adjusted under 35 U.S.C. 154(b) by 255 days.

(21) Appl. No.: 12/694,995

(22) Filed: Jan. 27, 2010

(65) Prior Publication Data

US 2010/0230521 A1    Sep. 16, 2010

Related U.S. Application Data

(60) Provisional application No. 61/160,381, filed on Mar. 16, 2009.

(51) Int. Cl.
*B02C 19/00* (2006.01)

(52) U.S. Cl. ............... 241/1; 241/DIG. 31; 241/301

(58) Field of Classification Search .............. 241/1, 301, 241/DIG. 31
See application file for complete search history.

(56) References Cited

U.S. PATENT DOCUMENTS

| | | |
|---|---|---|
| 5,115,983 A | 5/1992 | Rutherford, Sr. |
| 5,341,996 A | 8/1994 | Rutherford, Sr. |
| 5,482,215 A | 1/1996 | Veres |
| 5,683,038 A | 11/1997 | Shinal |
| 5,794,861 A | 8/1998 | Rutherford, Sr. |
| 6,435,435 B1 * | 8/2002 | Mazurkiewicz ............. 241/301 |
| 6,601,788 B2 | 8/2003 | Garner |
| 2006/0006257 A1 * | 1/2006 | Narui .............................. 241/1 |

* cited by examiner

*Primary Examiner* — Faye Francis

(57) ABSTRACT

The present invention is Micro-erosion Recovery System for separating recyclable tire materials (rubber, steel and fiber) and complying with quality standards governing the use of recovered tire materials. It is also a highly efficient apparatus and system for producing large amounts of high quality crumb rubber and steel.

17 Claims, 8 Drawing Sheets

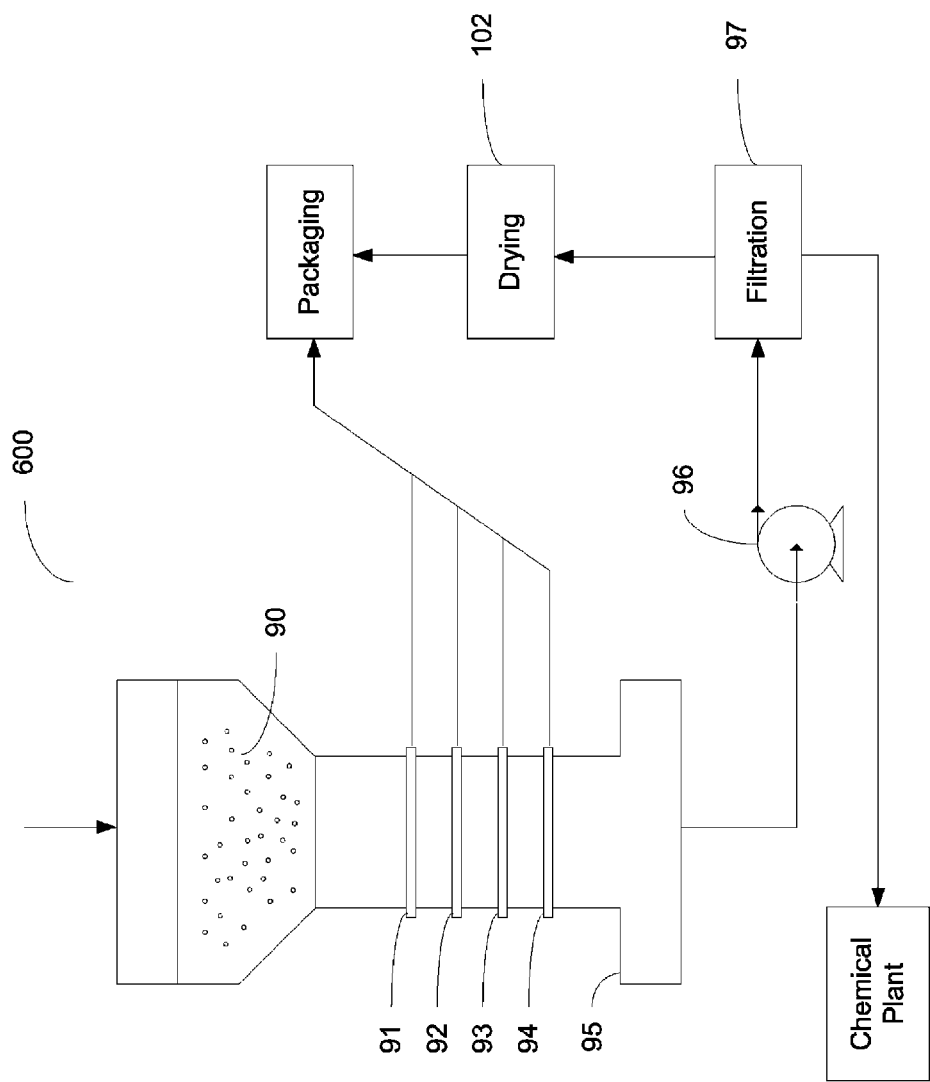

MICRO-EROSION RECOVERY SYSTEM FOR TIRE MATERIALS

CROSS-REFERENCE TO RELATED APPLICATIONS

This application claims priority to U.S. Provisional Application No. 61/160,381 filed on Mar. 16, 2009.

FIELD OF INVENTION

The present invention relates to the field of tire recycling systems and more particularly to a micro-erosion recovery system (MERS) for tire materials.

BRIEF DESCRIPTION OF THE DRAWINGS

FIG. 6a illustrates an exemplary embodiment of a crumb processing assembly.

GLOSSARY

Figure 1:
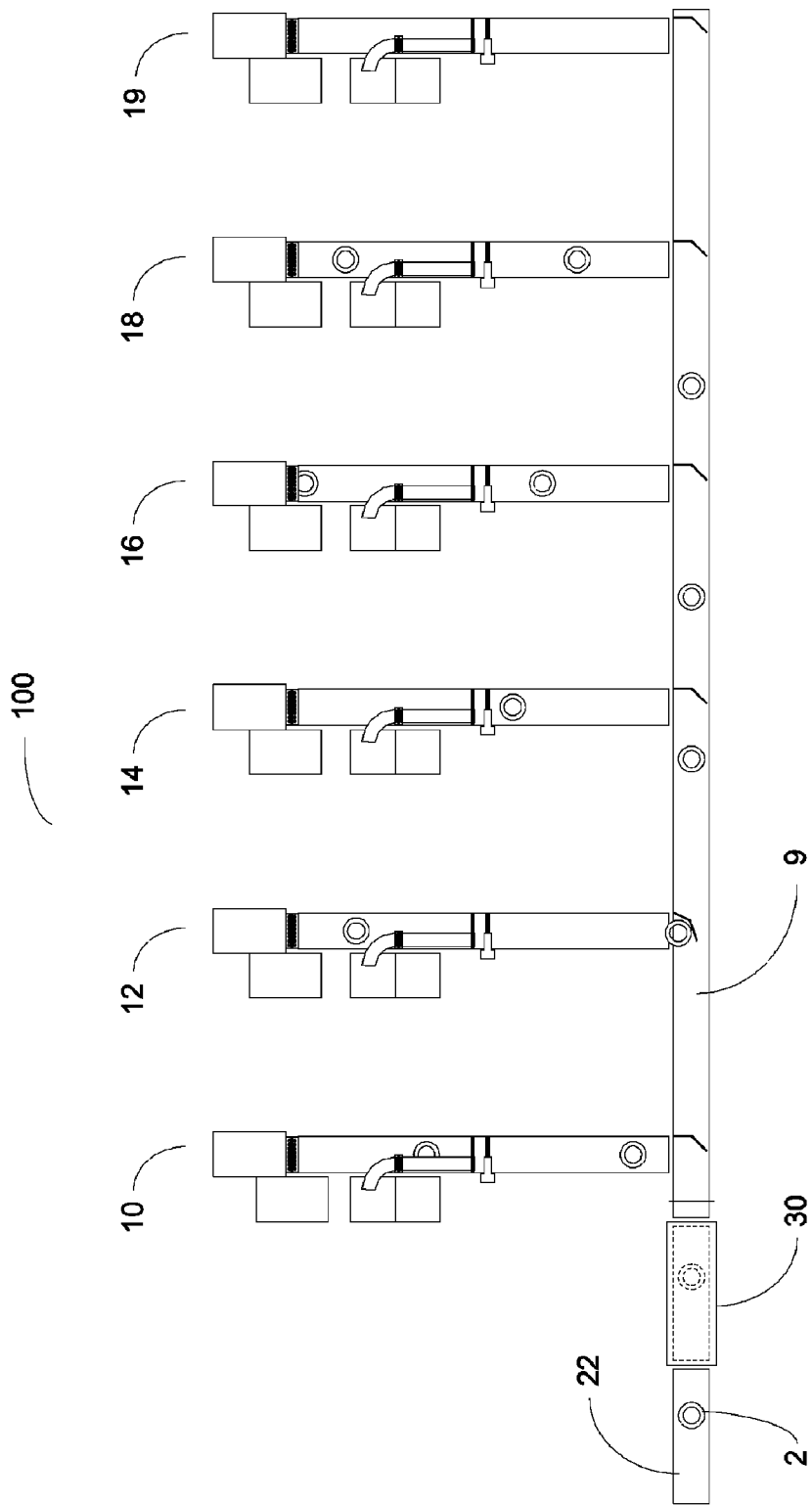
FIG. 1 illustrates a perspective view of an exemplary configuration of a multi-line micro-erosion recovery (MERS) system for tire materials.

As used herein, the term "sidewall" refers to the portion of a tire between the tread and rim of a tire. A sidewall may be comprised of rubber, steel (or other metal), fiber, Kevlar™ and functionally equivalent materials.

As used herein, the term "crumb rubber" refers to recycled rubber that has been reduced to particles.

As used herein, the term "steel bead" refers to a portion of the tire against the rim that holds the tire on the rim.

As used herein, the term "tire" refers to a rotational component of vehicle which may have a tread, a sidewall, a shoulder, a bead and a belt.

As used herein, the term "tread" refers to the region of a tire designed to contact the ground. It is molded of tough rubber for high traction and low wear, which is located between the shoulders. A tread may be comprised of rubber, steel (or other metal) and fiber and functionally equivalent materials.

As used herein, the term "shoulder" refers to the portion of the tire which is the transition area between the sidewalls and the tread. A shoulder may be comprised of rubber, steel (or other metal) and fiber and functionally equivalent materials.

As used herein, the term "I/O processor" refers to a component which may monitor the functioning of the system intergraded with man-machine interface, the quantity of tires processed, the amount of material recovered, and/or other discrete and analog signals, such as density sensors, location of density sensors, run status of equipment and motor components, and input signals (e.g., robotic sweeping action, robotic grasping action, tire counter, crumb output). I/O processor may generate reports related to MERS processing, may be programmed with revenue processing and inventory control capabilities or other functionality.

As used herein, the term "robotic arm" refers to a mechanical component for which movement is controlled by program logic. Movement functionality may be linear or nonlinear.

As used herein, the term "robotic sweeping arm" refers to a mechanical component which pushes a tire onto processing channels.

As used herein the term "robotic grasping arm" refers to the non-linear movement of a mechanical component positions a tire.

As used herein, the term "pulverizes" refers to the act of grinding to a mesh, particles, pieces powder or dust.

As used herein, the term "micro-erosion" refers to a process by which water or other fluid pressure is applied to a surface causing the surface erode into smaller particles, pieces, mesh or powder.

As used herein, the term "MERS unit" refers to a processing channel having at least one tire processing surface and at least one water jet capable of performing micro-erosion. A tire processing channel may further include one or more robotic arms or components, bins or other assemblies and components used for the process of recycling tire materials using a micro-erosion process.

As used herein, the term "uncut rubber tire" means a tire of any size which has not been shredded, cut or disassembled.

As used herein, the term "central conveyer" is an mechanical component that moves a tire from one processing channel to another.

As used herein, the term "processing channel" means a surface and configuration of water jets used to apply a micro-erosion recovery process to a tire.

BACKGROUND

There is a need for improved tire recycling operations both to address the need to dispose of used tires in an environmentally sound manner and to satisfy an estimated $68 billion per year demand in the U.S. for rubber. This market increases at a stable rate of approximately 6% per year.

In the U.S. alone there is a need to dispose of over $300 million in used tires annually. Approximately 12% of tire refuse currently ends up in landfills.

Currently, 52% of used tire refuse in the U.S. is disposed of by creating tire derived fuel (TDF). However, a crisis is emerging in the recycling industry because TDF is a controversial "dirty" type of fuel. TDF fuel fails to meet EPA emission standards. It is expected that this disposal/recycling method will be foreclosed and other methods for recycling and tire disposal will be desperately needed as TDF fuel no longer remains a recycling and disposal option. Only about 17% of refuse tire rubber is presently recovered and re-used to produce actual rubber products. The economics of recycling rubber products are tenuous, because the present art relies on using a cumbersome multi-step process that must be performed at multiple locations. The end usable product is referred to as "crumb rubber."

As consumer demand for products containing ground or crumb rubber is increasing, the desirability of diverting more tire refuse to crumb rubber production is apparent.

A recycling crisis coupled with demand for a recycle product create a unique, historic economic opportunity which present rubber recycling and crumb rubber processing technologies cannot address. Industries will pay a premium price both for rubber disposal options and for high quality crumb rubber. It is desirable to have a technology positioned to take advantage of these converging economic trends.

Current rubber recovery processes are highly inefficient and marginally profitable, under the best of circumstances. Tire shredding and methods of recovering rubber, steel and fiber from used tires are processes known in the art. Current processes generally recover approximately 78-92 percent of the total rubber material in a tire, but the quality of rubber is substandard for many commercial uses. The end-product rubber contains significant metal contaminant and iron oxide contaminants. These contaminants prevent the rubber from meeting the requirements for end-uses for any high-end products.

Water-jet processes for reclaiming rubber from used tires are known in the art; however, these methods require some shredding. These methods are inefficient and lead to contamination, which lowers the value of the recovered rubber.

The American Society for Testing and Materials (ASTM), which is an international organization charged with developing standards for rubber and other materials, promulgates standards for rubber which dictate the uses for recovered rubber. ASTM standards establish the level of contaminants and other materials.

Crumb rubber, or recycled rubber that has been reduced to particles, is the most valuable type of recycled rubber. The size of the particles is referred to as "mesh size."

Tyler mesh size is the number of openings per (linear) inch of mesh. To calculate the size of the openings in a mesh the thickness of the wires making up the mesh material must be taken into account. In practice, mesh openings are determined referring to a chart like the one below which uses a scale known as the Tyler mesh scale:

| Sieve size (mm) | BSS | Tyler (approx) | US (approx) |
| --- | --- | --- | --- |
| 4.75 | — | 4 | 4 |
| 3.35 | 5 | 6 | 6 |
| 2.81 | 6 | 7 | 7 |
| 2.38 | 7 | 8 | 8 |
| 2.00 | 8 | 9 | 10 |
| 1.68 | 10 | 10 | 12 |
| 1.40 | 12 | 12 | 14 |
| 1.20 | 14 | 14 | 16 |
| 1.00 | 16 | 16 | 18 |
| 0.853 | 18 | 20 | 20 |
| 0.710 | 22 | 24 | 25 |
| 0.599 | 25 | 28 | 30 |
| 0.500 | 30 | 32 | 35 |
| 0.422 | 36 | 35 | 40 |
| 0.354 | 44 | 42 | 45 |
| 0.297 | 52 | 48 | 50 |
| 0.251 | 60 | 60 | 60 |
| 0.211 | 72 | 65 | 70 |
| 0.178 | 85 | 80 | 80 |
| 0.152 | 100 | 100 | 100 |
| 0.125 | 120 | 115 | 120 |
| 0.104 | 150 | 150 | 140 |
| 0.089 | 170 | 170 | 170 |
| 0.075 | 200 | 200 | 200 |
| 0.066 | 240 | 250 | 230 |
| 0.053 | 300 | 270 | 270 |
| 0.044 | 350 | 325 | 325 |
| 0.037 | 440 | 400 | 400 |

In addition to standard U.S. and Tyler mesh sizes, commercial sieves in the U.S. can also utilize three other standards.

A problem known in the art is that tire recycling operations are inherently costly because they involve a number of sequential size reduction steps to convert used tire rubber to "crumb rubber" which is usable for rubber products.

Generally, the tire recycling process is a costly, low-yield, high cost process involving one or more of the following steps using multiple machines at multiple locations using conveyors and "air movement" systems:

Primary shredding process—Cutting/shredding tires into sections using a primary shredding process that reduces the space required for transporting the tires for further processing (i.e., air space within the tire structure). Generally, this will produce remnants of rubber, steel and fiber that vary in size. This process is generally performed by shredding machines, rapsers and other machines for reducing the size of tires known in the art.

Secondary shredding process—Further reduces larger sections of rubber into chips (e.g., 3 inches or less). During this process, rubber, steel and fiber are co-mingled, producing a quantity of mixed fragments of each. This process is generally performed by a "secondary shredder" known in the art.

Tertiary shredding process—This process is a further size reduction process which is generally used to create even smaller chips (depending upon the end use for the product). Currently, tires must be reduced in size in some manner because current machinery known in the art is not adapted to remove rubber directly from tires.

Grinding and hammer milling process—Reducing the chips into rubber particles with varying mesh size (which is a measurement of size reduction based on holes per square inch).

Removing the steel for sale to those respective markets—This process often uses multiple magnets during a sifting process.

Removing the fiber for sale to those respective markets—The machine known in the art that performs this function is generally referred to as an air "classifier" or "air gravity separation chamber."

Generally, the price for which recovered rubber and steel can be sold depends upon the level of contaminants in the product. It is therefore desirable to reduce the levels of contaminants in the product.

Rubber which meets the (ASTM) standards for a wider variety of products (e.g., such as off-road tires, automotive, consumer products) can be sold at a higher price. Specific materials standards apply to various types of products. Rubber that does not meet the standard for high-quality uses is sold for less. For example, rubber which meets higher ASTM standards may sell for as much as twelve times the cost of lower quality rubber (e.g., asphalt, fuel grade or aggregate quality rubber).

Generally, using current processes, the higher the rubber recovery rate the more metal contaminants the rubber will have. For example, a process which scrapes rubber and avoids contact with the metal tire treads will be reasonably free of metal contaminants, but will have a relatively low recovery rate. A more efficient tire stripping method will recover a greater percentage of rubber, but the rubber will include more iron oxide and metal contaminants.

A similar problem exists with regard to steel recovered in the process. Generally, steel recycling ("smelting") requires recovered steel which has less than 5% rubber (by volume) adhered to the steel. With current tire recycling processes, the higher recovery rates usually result in increased levels of rubber contaminants.

It is desirable to have a single integrated machine and/or system to reduce the number of steps and processes necessary to reduce rubber to crumb rubber.

It is further desirable to increase the quantity of rubber and steel that can be recovered from each used tire.

It is further desirable to increase quality of rubber and steel recovered from used tires consistent with ASTM standards because recovered material has an increased value and can be used for a wider range of purposes.

It is further desirable to extend the mechanical life of equipment currently used to recover rubber, steel and fiber from used tires.

It is further desirable to integrate the de-vulcanization and re-vulcanization processes with tire recycling and recovery processes.

It is further desirable to reduce the operating costs of tire recycling operations.

SUMMARY OF THE INVENTION

The present invention is a Micro-erosion Recovery System for separating recyclable tire materials (rubber, steel and fiber) and complying with quality standards governing the use of recovered tire materials. It is also a highly efficient apparatus and system for producing large amounts of high quality crumb rubber and steel.

DETAILED DESCRIPTION OF INVENTION

For the purpose of promoting an understanding of the present invention, references are made in the text to exemplary embodiments of a micro-erosion recovery system (MERS) for tire materials, only some of which are described herein. It should be understood that no limitations on the scope of the invention are intended by describing these exemplary embodiments. One of ordinary skill in the art will readily appreciate that alternate but functionally equivalent micro-erosion recovery systems for tire materials may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change in the basic function to which it is related.

FIG. 1 is an exemplary embodiment of multi-line MERS system 100 comprised of MERS units 10, 12, 14, 16, 18 and 19. In the embodiment shown, six MERS units are shown, five of which operate simultaneously and one line is redundant (back up) line to prevent operational downtime in the event of mechanical failure and maintenance. Other systems may have more or fewer or differently configured MERS lines. In the embodiment shown, MERS units 10, 12, 14, 16, 18 and 19 are positioned in a linear configuration. In alternative embodiments, MERS units 10, 12, 14, 16, 18 and 19 may be configured in a lateral stacked configuration, circular configuration semi-circular configuration, I-shaped configuration, angular configuration or any other configuration necessary to accommodate the space constraints of a building.

In the embodiment shown, tire 2 is loaded into conveyer entry point 22, and loading may be accomplished using a variety of methods and apparatus configurations. For example, tires may be loaded onto conveyor entry point 22 with a stationary or movable rod or belt (not shown) extending through the tires' central holes. In another example, tires can be stacked for processing on stationary or movable table, rack, belt, etc.

Tires may be car, truck, tractor, semitractor, transport, airplane tires, off-road tires, machinery tires, monster tires or any other tire known in the art which is constructed of rubber, steel, fiber, Kevlar™ and functionally equivalent materials. MERS units 10, 12, 14, 16, 18 and 19 can recover any of the foregoing materials.

Tire 2 (from which the rim has been removed) passes through wash station housing 30 which encases a series of water spray nozzles (not shown) known in the art which are used to clean and remove debris from tires 2. Tires 2 are moved along conveyer belt which is any type of conveyer apparatus or functionally equivalent device known in the art.

Figure 2:
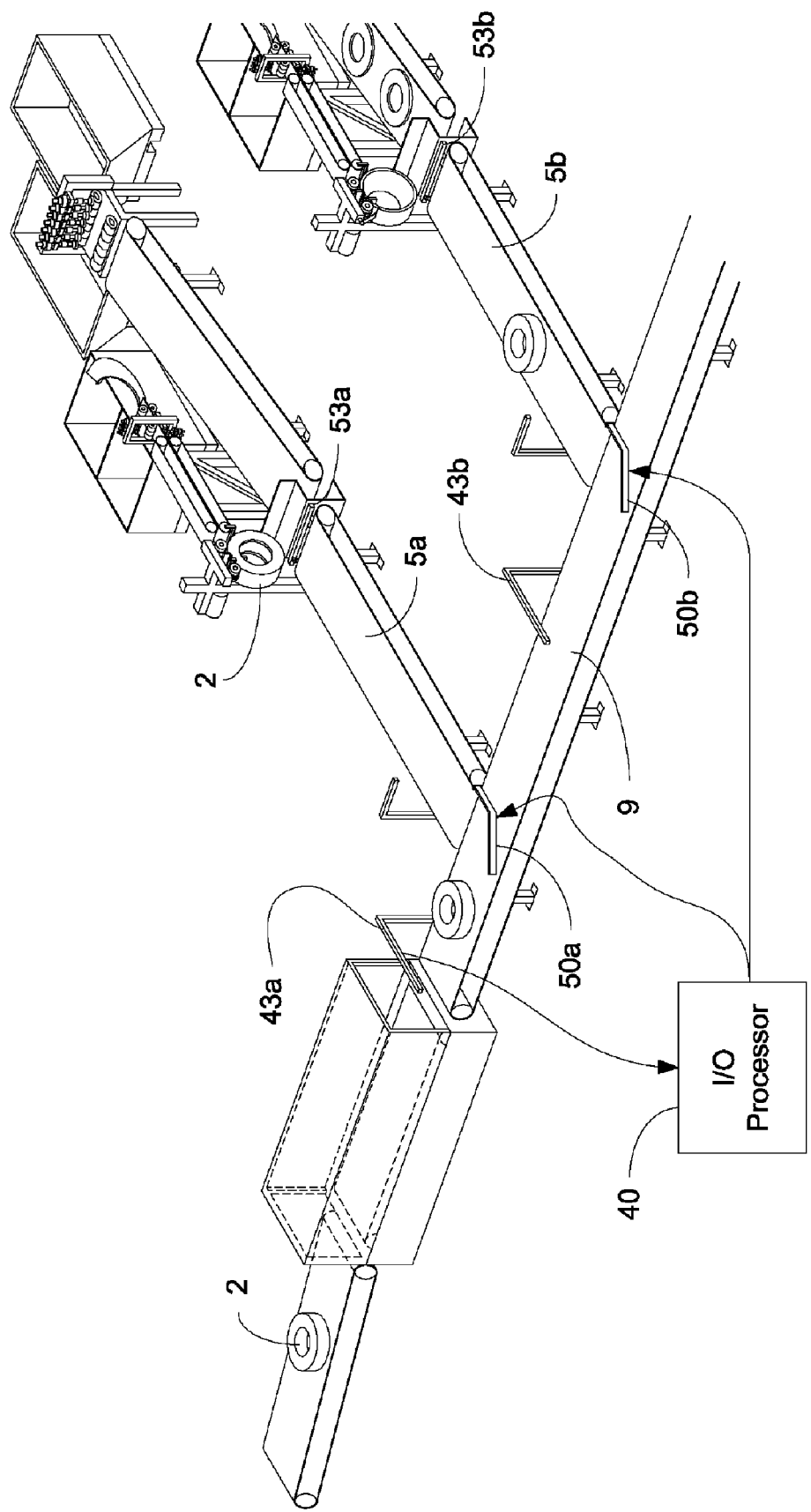
FIG. 2 illustrates a perspective view of an exemplary embodiment of two adjacent units of an MERS system.

Tire 2 further included sidewalls and treads, which may consist of rubber, fiber, steel, Kevlar™. As illustrated in FIG. 2, MERS system is configured with a plurality of tire position sensors 43a, 43b that sense the position of each tire 2 along conveyer 9 and send an electronic signal (hardwired or wireless via a local or distributed network) to I/O processor 40.

I/O processor 40 may monitor the functioning of the system, the quantity of tires processed, the amount of material recovered and all discrete and analog signals. I/O processor 40 may generate reports related to MERS processing, may be programmed with revenue processing and inventory control capabilities or other functionality.

I/O processor 40 is configured with software and program logic which interprets the multiple signals sent by tire position motion sensors to communicate the position of the tires along the conveyer with a plurality of first robotic sweeping arms 50 which sequentially divert tires 2 into processing channels 5a, 5b.

In the embodiment shown, robotic sweeping arms 50a, 50b (shown in FIG. 2) and robotic grasping arms 53a, 53b use servo motors known in the art or any functionally equivalent motor adapted to control robotic components using electronic signal. In the embodiment shown, robotic grasping arms 53a and 53b include robotically controlled brackets or pads which exert counter pressure to lift tires 2.

Figure 3:
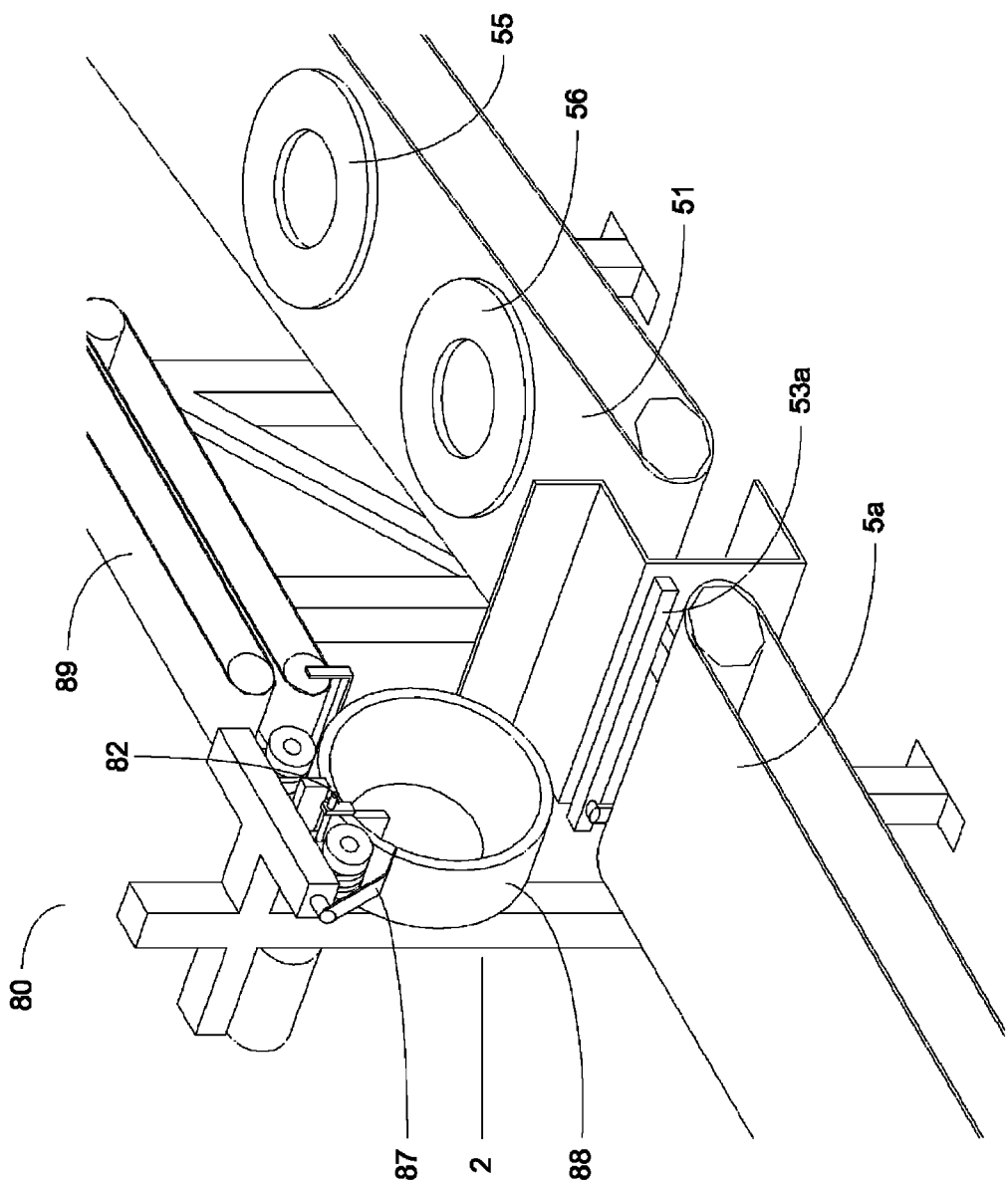
FIG. 3 illustrates a perspective view of an exemplary embodiment of a sidewall cutting assembly of a MERS unit.

FIG. 3 illustrates an exemplary embodiment of a tire 2 being grasped by robotic grasping arm 53a in a substantially upright position after tire 2 has been directed into channel 5a. Robotic grasping arm 53a has the capability of movement up to six non-linear axis to enable sidewall cutting implement 82 to cut the sidewalls off tire 2. Sidewalls 51 fall onto lower conveyor 51 and are moved toward sidewall processing station shown in FIG. 7.

In various embodiments, MERS system 100 may utilize high-precision robotic positioning systems for use in a wide variety of applications. For example, MERS robotic arms may be based on various robotic systems known in the art offering high load capacity and range of movement while maintaining a high degree of precision and repeatability.

FIG. 3 further illustrates sidewall cutting assembly 80, which includes sidewall cutting implement 82. In various embodiments, sidewall cutting implement 82 may be a laser jet, water jet, blade or knife positioned to remove sidewall. The movement of sidewall cutting implement 82 may be controlled by robotic or other simple mechanical means.

Figure 5:
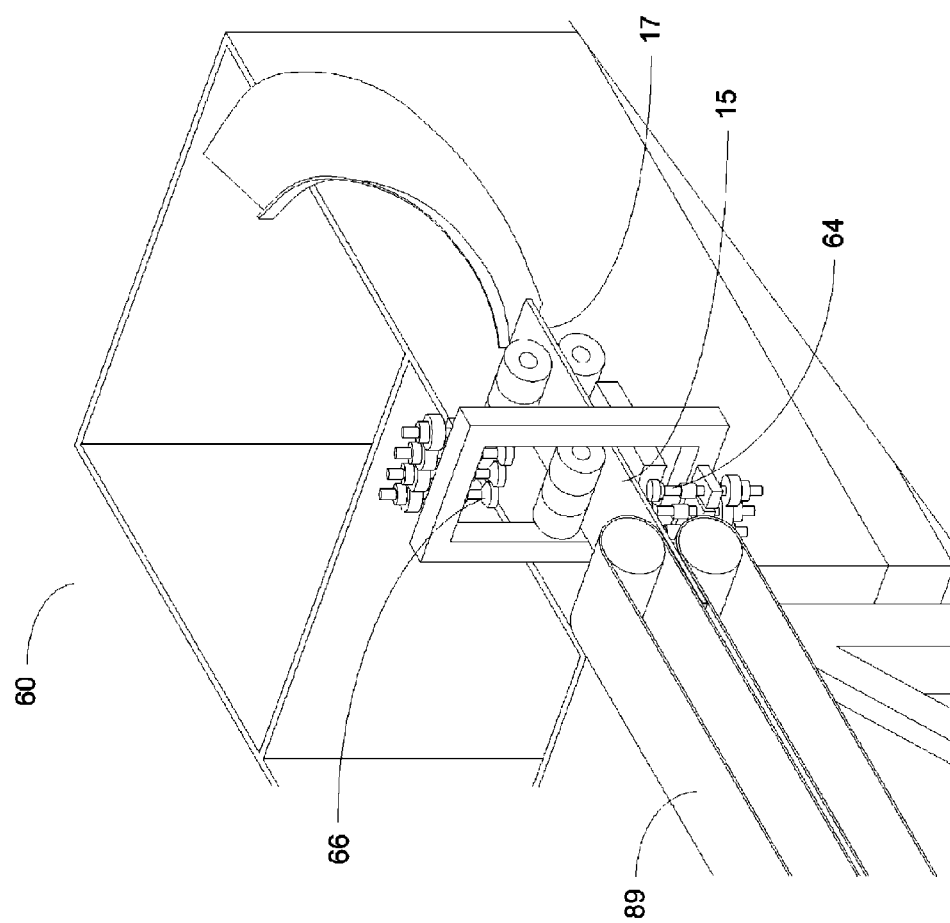
FIG. 5 illustrates a perspective view of an exemplary embodiment of a tread processing station of a MERS unit.

Sidewall cutting assembly further includes tread cutting implement 87 which slits the tread (which is comprised of rubber, and fiber) so that the tread portion 88 can be stretched into a single linear configuration which is fed into roller assembly 89 where tread portion 88 it is stretched flat between two conveyors and moved toward tread processing station 60 (shown in FIG. 5). Sidewalls 55 and 56 drop onto sidewall conveyer 59 and are conveyed or otherwise moved toward sidewall processing station 70 (shown in FIG. 6).

Figure 4:
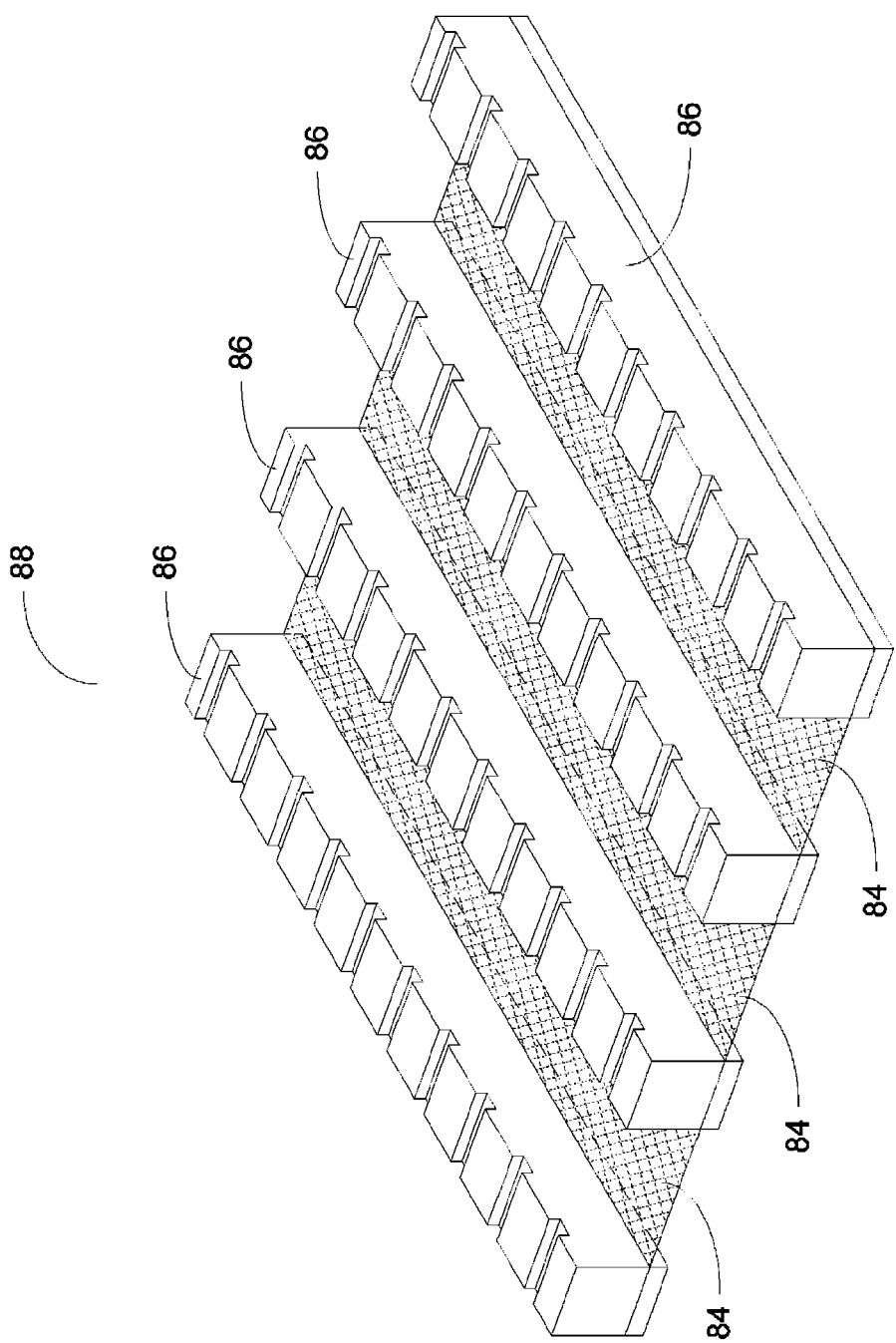
FIG. 4 illustrates a perspective view of a partial, flattened tire tread.

FIG. 4 illustrates a top view of tread portion 88, having rubber portions 86 and steel portions 84, of which tread portion 88 is comprised.

FIG. 5 illustrates an exemplary embodiment of an MERS tread processing station 60. Tread processing station includes a series of underside water jets 64 which are directed to the underside of the tread and a series of topside water jets 66 which are directed to the topside of the tread.

When activated, underside water jet 64 and topside water jet 66 direct a stream of water at a high speed and pressure over the topside tread surface 16 and underside tread surface 17.

Because of the speed/pressure and flow rate of the water, a multitude of tiny cracks or cavities are progressively formed in the surface of the rubber, causing the rubber surface to separate into a fine mesh powder ("pulverized"). This process is known in the art as micro-erosion.

The size of the particles is referred to as "mesh size." The mesh size of the particles in the exemplary embodiment shown may range from 400 mesh to in excess of 1 mesh on the Tyler mesh scale. (Other mesh scales may be applied).

In the embodiment shown, the mesh size of the particles processed by jets 64, 66 is 1-400 mesh, as defined by the Tyler mesh scale.

Water jets 64, 66 have a psi of 2,000 to 200,000. The angle of the nozzle relative to the tread enables changing of mesh size based on the angle of the nozzle relative to the tire and the distance the nozzle is from the tire.

In the embodiment shown, the mesh size of the particles after exposure to the water stream from jets 64, 66 is determined by three variables: the angle of nozzle (nozzle position), the distance of the water jet nozzle ("distance") relative to tread and the psi of water jets 64, 66. Nozzle position, distance and psi can be independently varied, or may be adjusted in combination to yield an optimum crumb rubber mesh size.

As the distance of the nozzle increases relative to the tread, if nozzle position and psi remain constant, the mesh size of the particle will generally increase.

As the pressure increases, assuming position and distance remain constant, mesh size of the crumb rubber particles will generally decrease.

Nozzle position, distance and psi can be independently varied or varied in combination to affect the speed of process ("through put").

As crumb rubber is produced by MERS tread processing station 60, it is moved by conveyor to receptacle or repository for packaging. Crumb rubber and water produced during the water jet process may be collected using any apparatus or method known in the art such as screening, multiple screening, filtration, sodium zeolite softening, Ph adjustment, total hardness adjustment and chloride control. Separation may also be accomplished by electrical or mechanical means such as air blowing, sonic and ultrasonic field separation and centrifuges.

FIG. 6a illustrates an exemplary crumb processing assembly 600 for crumb rubber collection, water filtration and treatment. In the embodiment shown, water and crumb rubber particles fall downward from tread processing station 60 (shown in FIG. 5) and passes through a series of mesh screens 91, 92, 93, 94 where the crumb rubber is collected and removed from the screens. Water from the jet cutting process described infra is collected in holding tank (sump) 95 to retrieve additional crumb rubber particles pumped using pump 96 and for reuse in the process. The additional crumb rubber particles retrieved from filtering are dried using drying apparatus 102 which is an air blowing or heat apparatus known in the art. In various embodiments, drying apparatus may also use other processes known in the art such as air blowing, sonic and ultrasonic field separation and centrifuges. Filtered and screened crumb rubber particles may then be transported and/or packaged for use, and will generally meet high market value ASTM standards.

Figure 6B:
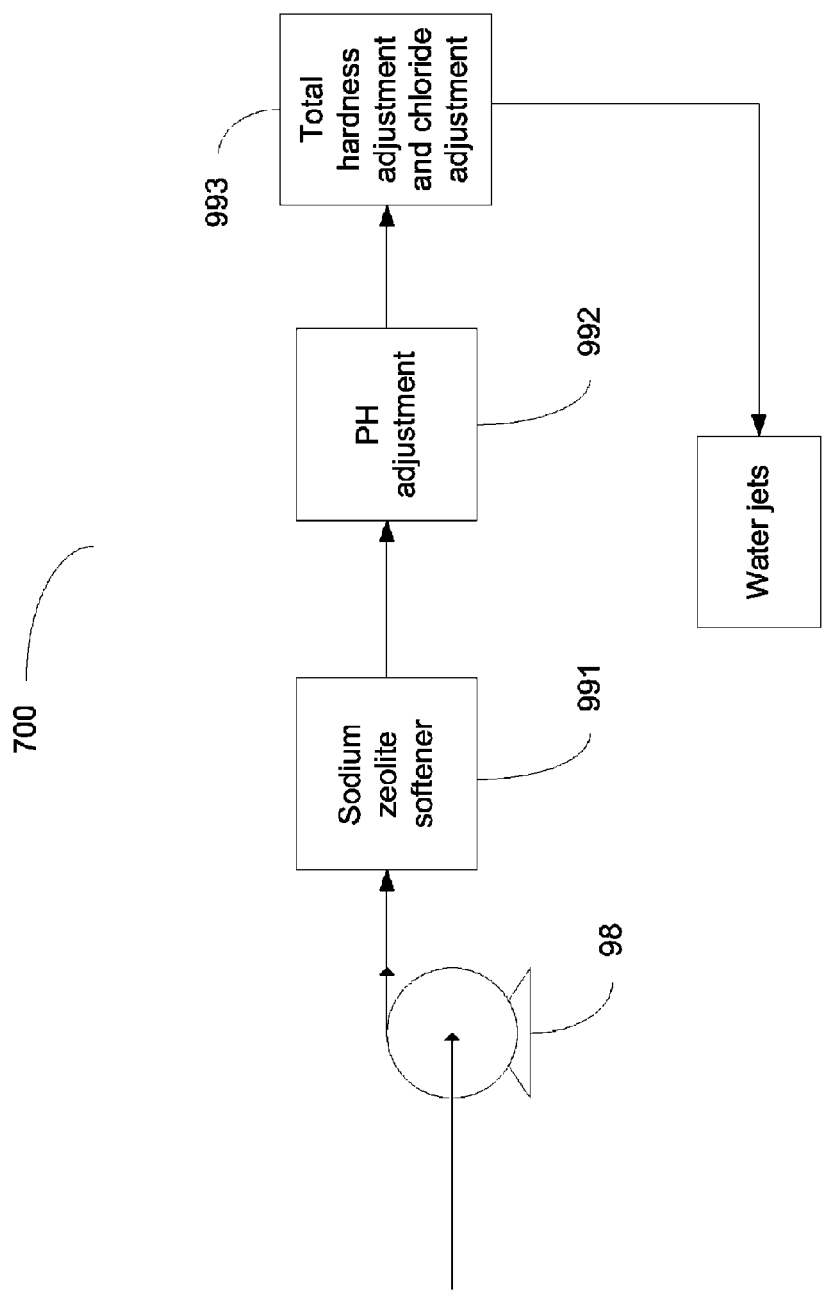
FIG. 6b illustrates an exemplary embodiment of a water chemical treatment system.

FIG. 6b illustrates exemplary water chemical treatment station 700. In the embodiment shown, water is pumped through pump 98, passes through sodium zeolite softening processor 991, Ph adjustment processor 992, total hardness adjustment and chloride adjustment processing 993.

Figure 7:
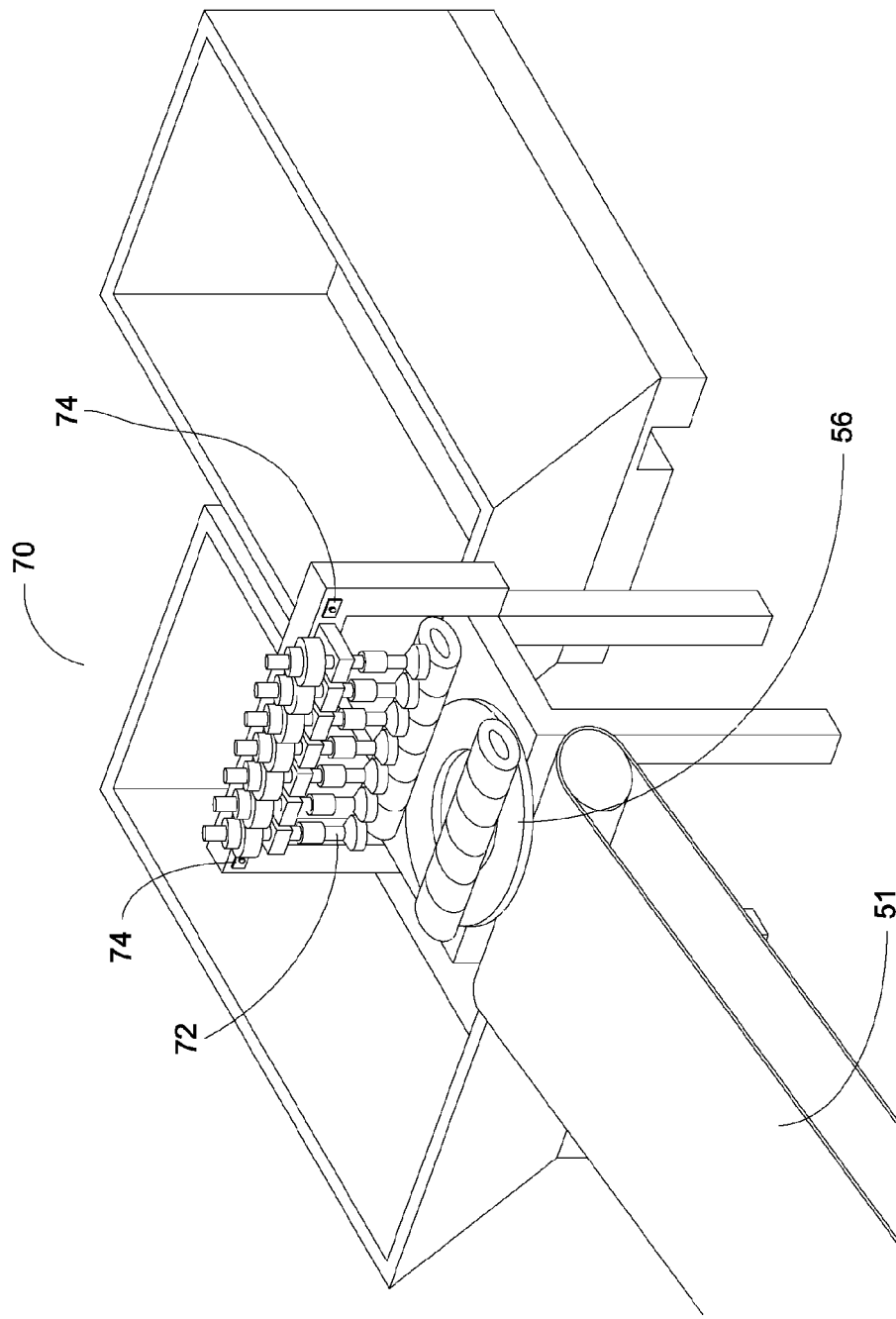
FIG. 7 illustrates an exemplary embodiment of a sidewall processing station of a MERS system.

FIG. 7 illustrates an exemplary embodiment of a MERS sidewall processing station 70.

Sidewall processing station 70 includes a series of water jets 72 that are directed to sidewall 56 and pulverized the rubber component, stripping the steel bead (not shown) clean using the process described in FIGS. 5, 6a and 6b.

What is claimed is:

1. A micro-erosion tire recycling apparatus comprised of:
at least one surface to which at least one tire may be secured, said at least one tire having at least one rubber portion and one steel portion, said rubber portion further including fiber; and
at least one water jet assembly for performing micro-erosion on at least one uncut rubber tire to pulverize said rubber portion of said and least one tire so that said at least one rubber portion is separated from a said steel portion; and
at least one robotic grasping arm for grasping at least one tire which is activated by a signal from at least one tire position sensor which senses the position of said at least one tire and grasps said at least one tire in a substantially upright position for separation of the sidewalls of said at least one tire.

2. The apparatus of claim 1 in which said at least one water jet assembly includes a plurality of water nozzles through which a water is emitted at a pressure in excess of 2,000 pounds per square inch.

3. The apparatus of claim which further includes at least one conveyor and at least one tire position sensor.

4. The apparatus of claim 3 wherein said at least one tire position sensor activates a robotic sweeping arm by sensing the position of the tire on said at least one conveyor.

5. The apparatus of claim 1 which further includes at least one sidewall cutting implement selected from a group consisting of a water jet, a blade, a knife and a laser.

6. The apparatus of claim 5 wherein said at least one water jet assembly can be adjusted to independently vary pressure, position and distance.

7. The apparatus of claim 1 which further includes at least one tread slicing implement for cutting at least one tread.

8. The apparatus of claim 1 which includes at least one roller assembly for flattening at least one tire tread between two conveyor belts.

9. The apparatus of claim 1 which further includes at least one crumb rubber retrieval component.

10. The apparatus of claim 9 wherein said at least one crumb rubber retrieval component includes a filtration system for retrieving crumb rubber particles from refuse water crumb rubber retrieval component.

11. The apparatus of claim 1 which converts at least 99.99% of rubber from said at least one tire to crumb rubber.

12. The apparatus of claim 1 which further includes an I/O apparatus capable of receiving input from at least one tire position sensor and generating at least one output signal to control a moving mechanical component.

13. The apparatus of claim 12 wherein said I/O apparatus is further capable of generating at least one notification message interpreted by a human.

14. The apparatus of claim 1 which further includes an I/O apparatus capable of receiving input selected from a group consisting of at least one conveyor motor, at least one sensor, at least tamper sensor and at least one density sensor.

15. The apparatus of claim 1 which further includes at least one robotic arm for manipulating the position of at least one tire.

16. An MERS system for reducing the amount of iron oxide in recycled rubber comprised of:
a central conveyer;
a plurality of MERS processing units capable of pulverizing rubber in a tire that is intact to create crumb rubber which separates from the steel portion of a tire; and
an I/O processor which controls said plurality of MERS processing units.

17. The system of claim 16 wherein each of said plurality of MERS processing units is comprised of at least one tire processing surface and at least one water jet capable of performing micro-erosion.

* * * * *